Sept. 25, 1962 W. D. PETERSON 3,056,083
ELECTRONIC TIME DISCRIMINATOR
Filed June 20, 1958
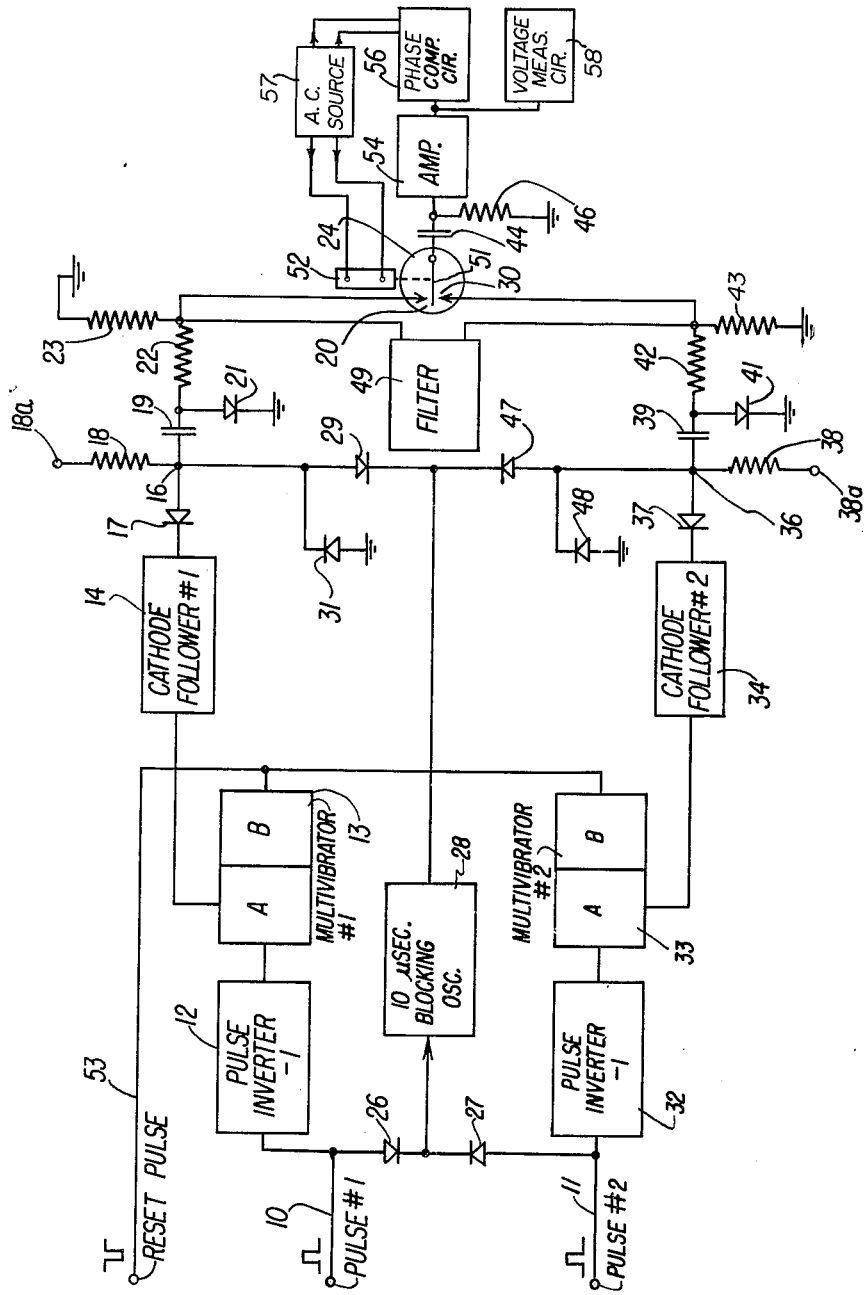
INVENTOR.
William D. Peterson
BY Mueller & Aichele United States Patent Office 3,056,083
Patented Sept. 25, 1962

3,056,083
ELECTRONIC TIME DISCRIMINATOR
William D. Peterson, Phoenix, Ariz., assignor to Motorola, Inc., Chicago, Ill., a corporation of Illinois
Filed June 20, 1958, Ser. No. 743,402
6 Claims. (Cl. 324—68)

This invention relates to electronic time discriminators and more particularly to pulse time discriminators adapted for use in radar systems or the like.

In radar and other navigational aid systems electronic apparatus must be provided which is capable of accurately timing an interval between two events such as the interval between two pulses. Some prior time discriminators have operated by charging a capacitor during an interval between successive events and then measuring the time by determining an output voltage proportional to the capacitor charge and hence the elapsed time. However, the charge on a capacitor varies linearly with charging time only for a small fraction of its charge cycle. This establishes the linear range of the discriminator system. When the interval between signals exceeds the linear range of the system, the output signal drops to zero so that the information derived from the system is ambiguous in that a zero reading may indicate either the receipt of no signals or the receipt of signals at intervals exceeding the linear range of the system. Such devices are unsatisfactory in many types of radar systems.

It is an object of this invention, therefore, to provide an electronic device for accurately determining the time interval between two events and simultaneously determining which event precedes the other.

It is a further object of the invention to provide an electric time discriminator which furnishes an unambiguous output signal when the time interval between two input signals exceeds a predetermined interval.

A feature of the invention is the provision of a capacitor connected to a reference point clamped at a fixed potential and associated with switching means for unclamping the reference point for a predetermined interval to permit charging of the capacitor during that interval or until the reference point is reclamped as in response to a second input signal.

Another feature of the invention is the provision of a pair of capacitors which are adapted to be charged from a reference potential to a different potential in response to one of two input signals. A sensing device is connected to output terminals coupled to the capacitors and develops a pulsating voltage output whose peak to peak value is proportional to the difference between the applied potential on one of the capacitors and the reference potential of the other. The phase of this pulsating voltage indicates which of the capacitors is at reference potential and which is at a developed potential. The magnitude of the developed signal voltage therefore indicates the interval between the two input signals and the phase of the output signal indicates which of two input signals preceded the other.

The accompanying single FIGURE on the drawing illustrates an electronic time discriminator in accordance with one embodiment of this invention.

In accordance with the invention, a time discriminator includes a capacitor connected to a reference point whose potential is clamped by the action of switching means such as a diode. A current source provided for charging the capacitor is prevented from doing so when the reference point is clamped. The detection of a signal by the system initiates a pulse of predetermined duration by starting a self-blocking oscillator. This oscillator is effective to deactivate the clamping means while it is in its duty cycle and permits the capacitor to be charged. The clamping means is reactivated either when the duty cycle of the oscillator terminates or when a second signal is detected. The charge on the capacitor is converted to a voltage proportional to the period of charging. By providing a pair of capacitors, each actuated under the influence of a signal received at a different input terminal, and providing means for alternately sampling the potentials of the capacitors, a pulsating output signal is developed whose phase is determined by which capacitor is charged to thereby indicate the order in which signals were received at the input terminals. The amplitude of the pulsating output signal is a measure of the time interval between input signals.

The accompanying block diagram illustrates a particular embodiment of the invention, and shows a pair of input terminals 10 and 11 for pulses the time interval between which is to be measured. Input 10 is serially connected to a pulse inverter 12 and a multivibrator 13 which has sides A and B. The A side of the multivibrator is connected to a cathode follower 14 whose output is connected to a reference point 16 through a diode 17. Also connected to the reference point 16 is a resistor 18 through which a current is applied from the terminal 18a. Reference point 16 is also connected to capacitor 19 one side of which is connected to ground through diode 21. The capacitor 19 is arranged to discharge through resistor 22 and the precision resistor 23 which is connected to ground. The resistance-capacitance network leads into terminal 20 of mechanical chopper 24.

Diodes 26 and 27 connected between the input terminals 10 and 11 direct the pulses received at these terminals to blocking oscillator 28. This oscillator is shown as having a duty or "on" cycle of 10 microseconds, which is merely illustrative. The output of the blocking oscillator is connected to diode 29 which is interposed between it and the reference point 16.

The input connection 11 leads to a symmetrical branch of the circuit which includes components corresponding to those making up the other branch. Thus, pulse inverter 32 is serially connected to multivibrator 33 which has sides A and B. Side A of the multivibrator is in turn connected to cathode follower 34 whose output is connected to the reference point 36 through the diode 37. A resistor 38 through which current is applied from terminal 38a is connected to the reference point 36 as are capacitor 39, diode 41, resistor 42 and precision resistor 43. The capacitor 39 is adapted to discharge through resistors 42 and 43 to terminal 30 of the mechanical chopper 24. The output of the chopper is fed through capacitor 44 and resistor 46 to an A.C. amplifier 54. A diode 47 is connected between the blocking oscillator 28 and the reference point 36 and is connected in parallel with a grounded diode 48. A suitable filter indicated by the block 49 is connected across the contacts 20 and 30 of the chopper 24.

The chopper 24 includes a reed 51 which is adapted to oscillate between chopper contacts 20 and 30 under the influence of a chopper drive coil indicated at 52. The drive coil is excited by an alternating current input 57 which controls and synchronizes the movement of the reed 51.

The cycle of operation of the system begins as a negative reset pulse is applied at the connection 53 to the B sides of multivibrators 13 and 33 thus setting the A side of each multivibrator in its high voltage state. Cathode followers 14 and 34 which derive their input signals from the A sides of the multivibrators 13 and 33, respectively, are also placed in the high voltage state by the reset pulse.

The blocking oscillator 28 is not connected to the reset pulse connection 53 and at the beginning of the cycle is in its off or rest position and its output is in the low voltage state. Therefore, the applied current flows through resistor 18 and the diode 29 to the blocking oscillator 28, the diode 29 being connected as shown to pass current in that direction. Current also flows from the ground to the oscillator across the diode 31. The slight forward voltage drop across the diode 31 serves to establish the reference point 16 at a slight negative potential and the reference point is effectively clamped at that potential by the high voltage output of the cathode follower 14 and by the action of the diode 17.

In the other branch of the circuit the reference point 36 is also clamped at a slight negative potential by analogous action since the output of cathode follower 34 is also in the high voltage state.

Assume that pulse No. 1 arrives at input connection 10 before pulse No. 2 arrives at input connection 11. The arrival of pulse No. 1 passing through diode 26 actuates the blocking oscillator 28 causing its output to rise to a relatively high voltage value which cuts off conduction of the diodes 29 and 47. At the same time, the pulse is inverted in the pulse inverter 12 and fed to the A side of multivibrator 13. Diode 27 is so connected as to prevent pulse No. 1 from actuating the other branch of the circuit. The inverted pulse switches side A of multivibrator 13 to the low voltage state which in turn causes the output of cathode follower 14 to drop to a low voltage level. This causes the current flowing in the resistor 18 from terminal 18a to be switched from the diode 29 to the diode 17 thus providing a second current path and leaving the reference point 16 clamped at the same small negative potential.

Because of the polarization of diode 27, pulse No. 1 has no effect upon pulse inverter 32 or multivibrator 33 whose output remains in the high voltage state. Therefore, when the blocking oscillator 28 is actuated and cuts off conduction of diode 47 the reference point 36 is effectively unclamped and the current flowing in resistor 38 from terminal 38a must flow to capacitor 39. This results in a charge being transferred to the capacitor 39 at a current approximately equal to the voltage drop across resistor 38 divided by the value of that resistance because capacitor 39 is charging for a period which is short in proportion to the time constant of the resistor 38 and the capacitor 39. The transferred charge is discharged through resistor 42 and the precision resistor 43 and the potential at the junction of these resistors appears as a voltage on terminal 30 of mechanical chopper 24. The magnitude of this voltage is determined by the length of time reference point 36 remains unclamped and capacitor 39 is charged. Charging is terminated either by the cutting off of the output of oscillator 28 or by the incidence of pulse No. 2 at input terminal 11, whichever occurs sooner.

Assuming that pulse No. 2 follows pulse No. 1 by a period shorter than the "on" cycle of oscillator 28, pulse No. 2 is inverted by pulse inverter 32 and switches the A side of multivibrator 33 to the low voltage state which causes the output of cathode follower 34 to drop. This reclamps reference point 36 and causes the current flowing in resistor 38 to be switched from capacitor 39 to diode 37.

The chopper reed 51 oscillates between contacts 20 and 30 at the frequency of the alternating current exciting coil 52 (typically 400 cycles per second) with the reed dwelling on each contact for approximately one half cycle. The reed is thus alternately at the potential of contact 20 which is near ground potential and the potential of contact 30 which is determined by the charge delivered by capacitor 39. The filter network 49 has sufficiently long time constants so that the potentials on the contacts will not be appreciably changed during the dwell period of the reed. The output signal of the chopper is thus a pulsating voltage whose peak to peak value is the difference between the reference potential on contact 20 and the applied potential on contact 30, which in turn is a measure of the time difference between pulse No. 1 and pulse No. 2.

If pulse No. 1 precedes pulse No. 2 by a period longer than the "on" cycle of the oscillator 28, 10 micro-seconds in the embodiment illustrated, the output from oscillator 28 will drop to a low voltage level at the end of the cycle thus causing diodes 29 and 47 to be thrown into conduction and supplying a current path for the current through resistor 38 thus reclamping reference point 36 and terminating the charging of capacitor 39. Thus, when the period of separation between the two pulses is greater than the linear limit of the system, in this case 10 micro-seconds, the maximum charge from capacitor 39 will be detected at the chopper and a maximum output signal obtained. In this way, the system differentiates between conditions when no pulses are received and conditions in which the period between the pulses exceeds a predetermined time unlike conventional time discriminators whose output signal drops to zero when the linear range of the system is exceeded.

If pulse No. 2 precedes pulse No. 1, that is, if a pulse is received at connection 11 before one is received at connection 10, the operation of the system is identical except that the interval determining voltage is fed to the chopper from the charging of capacitor 19 rather than capacitor 39 so that terminal 20 is at an applied potential and terminal 30 is at the reference potential. The phase of the pulsating output signal of the chopper will be shifted 180° from the signal obtained when pulse No. 1 precedes pulse No. 2. The output signal is amplified by the amplifier 54 and the peak to peak voltage measured by a suitable circuit 58. The signal passes to the phase comparison circuit 56 which determines whether it is in phase or out of phase with the current exciting drive coil 52. The time interval between the pulses, $\Delta t$, is determined by the formula, $$\Delta t = \frac{e_o R_1}{E R_2 F}$$

where $e_o$ is the peak to peak voltage of the output signal from the chopper 24, $F$ is the frequency in pulses per second of pulses No. 1 and No. 2, $R_1$ is the ohmic value of resistors 18 and 38 (which are equal), $R_2$ is the ohmic value of resistors 23 and 43 (which are equal) and $E$ is the voltage applied through resistors 18 and 38.

The invention, therefore, provides a relatively simple but reliable electronic system for measuring extremely short time intervals and is thus particularly useful in radar applications. Because the output of the system is at a maximum when the interval between input signals exceeds the linear range of the system, the information derived from the output is unambiguous in the sense that it distinguishes from conditions in which no signals are received. It will be understood, of course, that the particular circuits employed in providing a charging pulse of predetermined duration for the capacitors and for clamping and unclamping the reference points are merely illustrative and that means equivalent to the blocking oscillators, multivibrators and cathode followers may be employed.

I claim:

1. An electronic time discriminator including in combination, first and second capacitor means, first and second clamping means associated respectively with said first and second capacitor means for holding the voltage across the same at a fixed potential, first and second input portions, selective means responsive to an initial signal at said first input portions for selectively deactivating said first clamping means and responsive to a subsequent signal at said second input portion for reactivating said first clamping means, said selective means further being responsive to an initial signal at said second input portion for selectively deactivating said second clamping means and responsive to a subsequent signal at said first input portion for reactivating said second clamping means, means coupled to each of said capacitor means for charging the same upon deactivation of the clamping means associated therewith, means associated with each of said capacitor means for discharging the same upon reactivation of the clamping means associated therewith, whereby said first capacitor means is selectively charged and then discharged when the first of said two successive signals appears at said first input portion and said second capacitor means is selectively charged and then discharged when the first of said two successive signals appears at said second input portion, and measuring means responsive to such discharge of each of said capacitor means to detect the time interval between such signals, said measuring means having means for identifying the one of said capacitor means producing such discharge for establishing the order in which the input signals are received.

2. An electronic time discriminator including in combination first and second capacitors, electronic clamping means associated with each of said capacitors for clamping a first side thereof at a fixed potential, means coupled to a current source adapted to charge each of said capacitors upon deactivation of said clamping means, electronic means responsive to a first signal for selectively deactivating the clamping means associated with said first capacitor and reactivating said clamping means in response to a second signal, first and second output terminals coupled respectively to a second side of each of said capacitors so that the potential of each of said terminals is proportional to the current delivered by the discharge of its corresponding capacitor, synchronous means for alternating sampling the potential on said output terminals to produce a pulsating output signal, with the peak to peak voltage of the output pulse being indicative of the time interval between the first and second signals and the phase of the output signal being indicative of the order in which said input signals are received.

3. An electronic time discriminator including in combination, first and second signal input terminals, first and second capacitors, electronic clamping means associated with each of said capacitors for clamping a first side thereof at a fixed potential, means coupled to a current source adapted to charge each of said capacitors upon deactivation of said clamping means, electronic means responsive to the signal at said first terminal for selectively deactivating the clamping means associated with said first capacitor and responsive to the signal at said second signal input terminal for reactivating said clamping means, first and second output terminals coupled respectively to a second side of each of said capacitors so that the potential of each of said terminals is proportional to the current delivered by the discharge of its corresponding capacitor, an electrical contact, means activated by an alternating current of predetermined frequency for oscillating said contact between said output terminals at a predetermined frequency, means for measuring the peak to peak voltage of the output signal from said contact and means for comparing the phase of said output signal with the phase of the aforesaid activating alternating current.

4. An electronic time discriminator including in combination, first and second pulse input terminals, first and second capacitors, electronic clamping means associated with each of said capacitors for clamping a first side thereof at a fixed potential, means coupling each of said capacitors to a current source adapted to charge each of said capacitors upon deactivation of its associated clamping means, electronic means responsive to application of a pulse at either of said input terminals effective to selectively deactivate the clamping means associated with one of said capacitors and responsive to application of a pulse at the other of said input terminals to reactivate said clamping means, first and second resistors coupled respectively to a second side of said first and second capacitors, first and second output terminals coupled respectively to said first and second capacitors through said resistors, a mechanical chopper coupled to said output terminals including a reed adapted to pick off voltages from said output terminals, means for applying an alternating current of predetermined frequency and phase to said chopper to oscillate said reed, means for measuring the peak to peak voltage of the pulsating output signal of said chopper and means for comparing the phase of said output signal with the phase of said alternating current.

5. An electronic time discriminator including in combination, first and second pulse input terminals, first and second pulse inverter means coupled to said input terminals, a blocking oscillator connected in parallel with said pulse inverters, a pair of diodes coupled respectively between said input terminals and the associated pulse inverters, said diodes being connected so that a pulse received at either input terminal actuates said blocking oscillator but only the associated pulse inverter, first and second multivibrators serially connected respectively to said first and second pulse inverters and actuated by the output thereof, first and second cathode followers connected respectively to output sides of said multivibrators, first and second reference points connected respectively to the outputs of said first and second cathode followers, first and second current input terminals connected respectively to the outputs of said first and second cathode followers, first and second reference points connected respectively to said first and second current input terminals, diode means coupled to each of said reference points and cooperating with the respective cathode followers to clamp said reference points at fixed potentials when the respective cathode followers deliver a relatively low voltage output, first and second capacitors each coupled to a respective reference point and adapted to be charged by current from the associated current input terminal when the respective reference point is unclamped due to relatively high voltage output from the associated cathode follower, first and second resistors individually coupled to said capacitors, first and second output terminals coupled respectively to each of said resistors, a filter connected across said output terminals, a mechanical chopper activated by an alternating current of predetermined phase and frequency and coupled to said output terminals to alternately receive the potential of said output terminals and thereby provide a pulsating output signal when a potential difference exists between said output terminals, means for measuring the peak to peak voltage of said output signal, and means for comparing the phase thereof with the phase of the alternating current activating said chopper reed.

6. An electronic time discriminator including in combination, capacitor means, electronic clamping means for holding the voltage across said capacitor means at a fixed potential, means coupled to said capacitor means for charging said capacitor means upon deactivation of said clamping means, means responsive to a first signal for deactivating said clamping means and responsive to a second signal for reactivating said clamping means, timing circuit means for reactivating said clamping means a predetermined period of time after deactivation thereof, with such time corresponding to a selected portion of the time constant characteristic for charging of said capacitor means, means for discharging said capacitor means upon reactivation of said clamping means, and means responsive to such discharge to detect the time interval between said signals and providing a predetermined indication if the time between said signals exceeds said predetermined period of time.

References Cited in the file of this patent

UNITED STATES PATENTS 2,377,757    Clark ------------------ June 5, 1945

FOREIGN PATENTS 569,296    Great Britain ---------- May 16, 1945
577,937    Great Britain ---------- June 6, 1946